Figure 1:
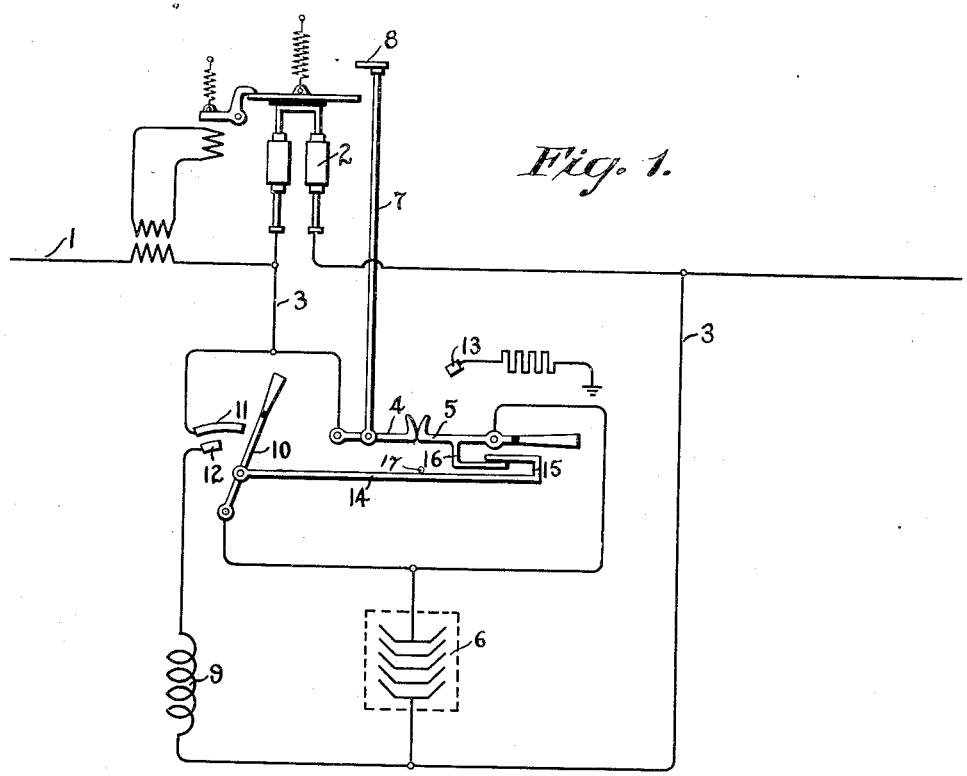

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

SYSTEM OF DISTRIBUTION.

1,111,365.  Specification of Letters Patent.  Patented Sept. 22, 1914.

Application filed March 30, 1911. Serial No. 617,827.

*To all whom it may concern:*

Be it known that I, ELMER E. F. CREIGHTON, a citizen of the United States, residing at Schenectady, in the county of Schenectady, State of New York, have invented certain new and useful Improvements in Systems of Distribution, of which the following is a specification.

My invention relates to systems of distribution and more particularly to maintaining continuity of service on electrical distribution systems.

In a station for several transmission lines, conditions often occur when the switches or circuit breakers controlling the lines are all opened at the same time. This may be due to an accident, such as a short circuit upon any one of the transmission lines or to a number of other faulty conditions upon the distribution system. When all of the circuit breakers in the station open at the same time, an operator has, at present, no way of telling upon which line or lines the trouble has occurred and, therefore, does not know which circuit breakers he may safely reclose. Even if the operator happens to know upon which line or lines the trouble has occurred, he has no way of determining whether the trouble is still existing or whether it was of a temporary character. For maintaining continuity of service, the operator, therefore, can only reclose the circuit breakers with the risk of subjecting the station apparatus to heavy electrical and mechanical strains should the trouble still exist or be reëstablished.

One of the objects of my invention is to overcome the above mentioned difficulties and maintain continuity of service by providing means for determining the line or lines upon which the trouble has occurred and also determining the question of the permanence of the trouble without subjecting the station apparatus to injury.

Further and other objects of my invention will be noted hereinafter.

When a switch or circuit breaker opens, I provide means for testing the condition of the line controlled by the circuit breaker, which consists in completing a circuit in shunt to the circuit breaker and in series to the line. This circuit is arranged to be completed first through a voltage limiting device, such as aluminum cells and then through an inductance in parallel to the voltage limiting device. The inductance is so proportioned that when the shunt circuit is completed, the line partially or completely resonates at operating frequency while the voltage limiting device limits the voltage of resonance to a safe value. It is thus possible by completing this shunt circuit or testing connection, to test the line with a voltage of greater value than the operating voltage and to possibly burn out the cause of a short circuit at the same time limiting the current and voltage to a safe value. If there is a permanent short circuit on the line or a ground, this fact will be indicated upon the station meters and the operator will be aware of the fact and the circuit breaker will not be closed. The voltage limiting device besides preventing a dangerous rise in voltage due to resonance, may be preferably one having a condenser action such as the aluminum cells above mentioned which acts to prevent or reduce the arc which tends to form as the circuit breaker or switch controlling the shunt circuit operate.

The novel features which I believe to be characteristic of my invention will be definitely indicated in the claims appended hereto, the features of construction and mode of operation will be understood by reference to the following description taken in connection with the accompanying drawings in which—

Figure 2:
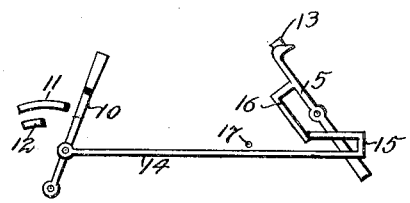

Figure 1 illustrates diagrammatically a single lead and circuit breaker embodying the novel features of my invention, and Fig. 2 illustrates diagrammatically a portion of the apparatus shown in Fig. 1 in another position.

The line 1 contains in series the usual circuit breaker, which I have shown as an oil switch 2. About this circuit breaker 2, I have placed a shunt 3 which includes the horn switch composed of two levers 4 and 5, and a potential limiting device 6 having preferably a condenser action, such as an aluminum cell, which is composed of as many plates as may be desired. A connection is made whereby this shunt 3 is opened after the opening of the circuit breaker. This may be done by the use of a rod 7 attached to the lever 4 of the horn switch. At the top of the rod 7 may be provided a finger 8, so disposed that some part of the circuit breaker will engage the finger after the complete opening of the circuit breaker and thereby raise the rod 7 and open the horn switch 4, 5. As, therefore, the circuit breaker 2 opens, due to a fault upon the line or otherwise, the voltage limiting device or condenser 6 in the shunt circuit 3 acts to prevent or to dissipate the surges set up due to the arc formed, from traveling along the line. At the same time, the voltage across the switch contacts is accordingly reduced thus destroying the energy of the disruptive arc and limiting the potential on the line. As the circuit breaker 2 reaches the limit of its open position, the voltage limiting device 6 is automatically disconnected from the line by the opening of the horn switch 4, 5. In shunt with the protector or condenser 6, I have placed an inductance 9, this inductance being designed, when it is in the line, to limit the current to a safe value and to cause partial or complete resonance with the capacity and inductance in the line at operating frequency. The condenser 6 is to be designed to limit the voltage of resonance to a desired value. An inductance switch arm 10 is located to engage the contacts 11 and 12. It will be noted that the contact 11 is located to engage the switch arm 10 prior to the engagement of the contact 12 with this switch arm, and thus the condenser 6 is thrown into the line prior to the inductance 9 upon the closing of the switch arm 10.

A contact 13 is grounded through suitable resistances and is adapted to be engaged by the arm 5 of the horn switch when this arm is in one position. This ground is provided in order to allow the necessary reforming of the aluminum cell. Obviously the switch 10 should not be closed when the switch arm 5 is in engagement with the ground contact 13 for then there would be a direct path for the current to ground as will appear from the drawing. Hence, I provide suitable means for preventing this position of the switch arms. For example, a rod 14 having the hooked end 15 to engage the hook 16 on the arm 5 and a pin 17 to prevent the rotation of the rod 14 may be used. Thus, when the arm 10 is in its extreme right hand position, as illustrated in Fig. 1, the arm 5 of a horn switch may be placed in engagement with the contact 13; the switch 10, however, cannot now be closed on account of the engagement of the hook 15 with hook 16 as will be apparent from Fig. 2. When the arm 5 of the horn switch is in the position shown in Fig. 1, the switch arm 10 may be thrown to the left, and, when the switch 10 is in its left hand position, the arm 5 cannot be raised since the hooks 15 and 16 again engage.

The operation of my device is as follows: Under normal running conditions the parts are disposed as shown in Fig. 1; the circuit breaker 2 is closed and the member 6 is in parallel therewith, the inductance 9 is cut out. When that trouble occurs upon the line, the circuit breaker 2 opens and the member 6 acting as a condenser, tends to minimize the arc in the circuit breaker and as a protector, limits the potential on the line. Shortly after the circuit breaker passes a point where the arc is extinguished, a moving part of the circuit breaker engages the finger 8 and opens the horn switch 4 and 5, thus cutting the member 6 out of the circuit. The attendant now desires to ascertain the condition of the line. He will now throw the switch arm 10 to the left until it engages with the contact 11. The member 6 is now in circuit and the line now receives voltage with a very small current; this may indicate directly on the line meters that the short circuit is still on the circuit. For a crucial test, he may move the switch 10 still farther to the left until it engages with both the contacts 11 and 12, thus connecting the inductance 9 in parallel with the member 6. In this case he has both high current and high voltage on the line, both limited however to such values as the line and connected apparatus should bear. Should the short circuit be persisting, he may use these high values in an attempt to burn it out. He is also able to test the insulation of the system at a higher voltage than normal to determine whether it is safe to continue service at normal voltage. Upon his opening of the switch arm 10, the spark at the contact 12 is minimized by reason of the switch arm 10 still being in contact with the contact 11 and the condenser 6 still being in circuit.

It is, of course, to be understood that the apparatus I have shown is merely illustrative to show one embodiment of my invention and numerous changes of the specific apparatus within the spirit of my invention may be made. There will be some changes according to the local conditions, as, for example, on some circuits all apparatus is disconnected from the line the instant the power is removed and the apparatus is subsequently reconnected, while on other circuits all apparatus, but motors, is left connected. These and other variations in the conditions of operation will necessitate corresponding variations in the application of the general principles above laid down.

What I claim as new, and desire to secure by Letters Patent of the United States, is,—

1. In a system of distribution a circuit breaker, an inductance and a capacity in parallel and in a shunt circuit to said circuit breaker, and means for cutting said inductance and then said capacity from said shunt circuit.

2. In a system of distribution a circuit breaker, an inductance and a potential limiting device in parallel and in a shunt circuit to said circuit breaker, and means for cutting said inductance and then said potential limiting device from said shunt circuit.

3. In a system of distribution, in parallel a circuit breaker, inductance and capacity, a switch to open the line to the inductance, and means to cut out the capacity after the opening of the circuit breaker.

4. In a system of distribution, in parallel a circuit breaker, inductance and a potential limiting device, a switch to open the line to the inductance, and means to cut out the potential limiting device after the opening of the circuit breaker.

5. In a system of distribution, in parallel a circuit breaker, inductance and a potential limiting device having a condenser action, a switch to open the line to the inductance, and means to cut out the potential limiting device after the opening of the circuit breaker.

6. In a system of distribution, in parallel a circuit breaker, inductance and capacity, a switch to open the line to the inductance, a switch to open the line to the capacity, and means connecting the circuit breaker and last mentioned switch to open the line to the capacity after the opening of the circuit breaker.

7. In a system of distribution, in parallel a circuit breaker, inductance and a potential limiting device, a switch to open the line to the inductance, a switch to open the line to the potential limiting device, and means connecting the circuit breaker and last mentioned switch to open the line to the potential limiting device after the opening of the circuit breaker.

8. In a system of distribution, in parallel a circuit breaker, inductance and a potential limiting device having a condenser action, a switch to open the line to the inductance, a switch to open the line to the potential limiting device, and means connecting the circuit breaker and last mentioned switch to open the line to the potential limiting device after the opening of the circuit breaker.

9. In a system of distribution, in parallel a circuit breaker, inductance and an aluminum cell, a switch to open the line to the inductance, a switch to open the line to the aluminum cell, a grounded terminal to be contacted by a switch arm, and means to prevent the contacting with the grounded terminal when the supply end of the system would be connected direct to ground thereby.

10. In a system of distribution, in parallel a circuit breaker, inductance and an aluminum cell, a switch to open the line to the inductance, a switch to open the line to the aluminum cell, a grounded terminal to be contacted by a switch arm, and means to prevent the closing of the inductance switch while said switch arm is in contact with the grounded terminal.

11. In a system of distribution a main circuit having a circuit breaker therein, an inductance, a switch for connecting said inductance in shunt to said circuit breaker, said inductance being proportioned to produce resonance in said main circuit at operating frequency, and a capacity for minimizing the arcs formed as said circuit breaker and said switch operate.

12. In a system of distribution a main circuit having a circuit breaker therein, a potential limiting device having a condenser action, an inductance, a switch for connecting said inductance in parallel with said potential limiting device to complete a shunt circuit to said circuit breaker, said inductance being proportioned to produce resonance in said main circuit at operating frequency.

13. In combination a main circuit having a circuit breaker therein, an inductance and capacity, and a switch for first connecting said capacity and then said inductance in parallel to complete a shunt circuit to said circuit breaker, said inductance being proportioned when so connected to produce resonance in said main circuit at operating frequency.

14. In combination a main circuit having a circuit breaker therein, an inductance, a potential limiting device, and a switch for first connecting said potential limiting device and then said inductance in parallel to complete a shunt circuit to said circuit breaker, said inductance being proportioned when so connected to produce resonance in said main circuit at operating frequency.

15. In a system of distribution a main circuit having a circuit breaker therein, an inductance, and a switch for connecting said inductance in shunt to said circuit breaker, said inductance being proportioned to produce resonance in said main circuit at operating frequency.

16. In a trial line connection, a circuit breaker and a potential limiting device in parallel, means operatively related to said circuit breaker for automatically opening the circuit through said potential limiting device after said circuit breaker opens, an inductance, and means for completing a testing circuit in shunt to said circuit breaker including said potential limiting device and said inductance in parallel, said circuit being completed first through said potential limiting device and then through said inductance.

17. In a trial line connection, a circuit breaker and a capacity in parallel, means operatively related to said circuit breaker for automatically opening the circuit through said capacity after said circuit breaker opens, an inductance, and means for completing a testing circuit in shunt to said circuit breaker including said capacity and said inductance in parallel, said circuit being completed first through said capacity and then through said inductance.

18. In a trial line connection, a circuit breaker and a potential limiting device having a condenser action in parallel, means operatively related to said circuit breaker for automatically opening the circuit through said potential limiting device after said circuit breaker opens, an inductance, and means for completing a testing circuit in shunt to said circuit breaker including said potential limiting device and said inductance in parallel, said circuit being completed first through said potential limiting device and then through said inductance.

In witness whereof, I have hereunto set my hand this 28th day of March, 1911.

ELMER E. F. CREIGHTON.

Witnesses:
BENJAMIN B. HULL,
HELEN ORFORD.